F. B. HOWELL.
BOILER.
APPLICATION FILED OCT. 23, 1914. RENEWED MAR. 8, 1921.

1,393,622.
Patented Oct. 11, 1921.
7 SHEETS—SHEET 2.

Witnesses
Anna Ross
Ed. H. Dietrich

Inventor
FRANK B. HOWELL
BY Conrad A. Dietrich
his Attorney.

F. B. HOWELL.
BOILER.
APPLICATION FILED OCT. 23, 1914. RENEWED MAR. 8, 1921.

1,393,622.

Patented Oct. 11, 1921.
7 SHEETS—SHEET 4.

Witnesses
Anna Ross
Ed. H. Dietrich

Inventor
FRANK B. HOWELL
BY
Conrad A. Dietrich
his Attorney.

UNITED STATES PATENT OFFICE.

FRANK B. HOWELL, OF BUFFALO, NEW YORK, ASSIGNOR TO AMERICAN RADIATOR COMPANY, OF CHICAGO, ILLINOIS, A CORPORATION OF NEW JERSEY.

BOILER.

1,393,622.      Specification of Letters Patent.      Patented Oct. 11, 1921.

Application filed October 23, 1914, Serial No. 868,193. Renewed March 8, 1921. Serial No. 450,672.

*To all whom it may concern:*

Be it known that I, FRANK B. HOWELL, a citizen of the United States, residing at the city of Buffalo, Erie county, in the State of New York, have invented certain new and useful Improvements in Boilers, of which the following is a full, clear, and exact specification.

My invention relates to improvements in boilers and the same has for its object more particularly to provide a sectional boiler for use in connection with heating systems which is adapted to burn bituminous or other soft fuel economically and smokelessly, and require only infrequent attention.

Further, said invention has for its object to provide a boiler having a fuel chamber or receptacle so constructed and arranged that the fuel will not bridge therein and thereby cause an unnecessary loss of heat or the dying down of the fire.

Further, said invention has for its object to provide a boiler having a fuel receptacle in which the fuel is supported in a vertical column which column is thick or of relatively large cross-sectional area at its intermediate portion or burning zone through which the draft passes crosswise, and then gradually tapers toward its upper and lower ends, in order to allow for the swelling or expansion of the fuel which begins just before the fuel enters the burning zone, and to allow for the shrinkage in the volume of the mass as the fuel is reduced to ash after passing through the burning zone, and to cause said ash to serve as a proper support for the fuel while passing downwardly through the burning zone.

Further, said invention has for its object to provide a boiler in which a part of the vertically supported column of fuel is maintained in a burning zone which is constant and unvarying in extent or volume and thus produces no change in the degree of draft.

Further, said invention has for its object to provide a boiler having an auxiliary air supply device which is so constructed and arranged that the exact volume of air may be supplied to the gases liberated from the fuel, and the said air so admitted to the combustion chamber be heated to the proper degree to insure the immediate ignition of the combustible gases as they are liberated from the burning mass of fuel.

To the attainment of the aforesaid objects and ends my invention consists in the novel details of construction, and in the combination, connection and arrangement of parts hereinafter more fully described and then pointed out in the claims.

In the accompanying drawings wherein like numerals of reference indicate like parts,—

The boiler represented in these drawings comprises end sections 20, 21, intermediate front sections 22 which are shallow in the direction of the draft or lengthwise of the boiler, and deep intermediate rear sections 23 which are so arranged with reference to the front sections that a fuel receptacle 24 extending from one end section to the other is formed between the front and rear sections.

Figure 10:
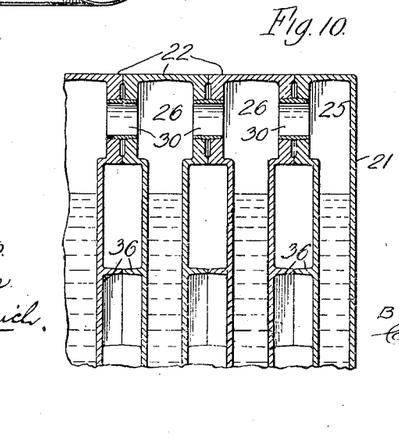
Fig. 10 is a vertical section of the upper portions of several front sections on line 10—10, Fig. 3.

Each end section is hollow and forms an end wall for the boiler which extends from the front to the rear thereof. The upper portions 25 of the end sections, the upper portions 26 of the front sections, and the upper portions 27 of the rear sections are so wide that these portions bear with their facing ribs or surfaces against each other and form a practically tight closure between the sections, Figs. 5, 6 and 10. The upper portions of the end sections and of the rear sections are provided with relatively large communicating openings 28 in which are arranged nipples 29, Fig. 5, tapering from the middle toward both ends, whereby the internal spaces or cavities of adjacent sections are tightly connected. The upper portions 26 of the front sections are similarly connected by nipples 30, Fig. 10.

The lower portions 31 of the end sections, the lower portions 32 of the front sections, and the lower portions 33 of the rear sections are as wide as the top portions of these sections so that the sections contact with each other at their upper and lower portions. The lower portions of the front sections are connected by nipples 34, Fig. 11, and the lower portions of the rear sections are connected by nipples 35, Fig. 5.

Between the contacting upper and lower portions the end and rear sections are contracted so as to leave flues or heating passages between them, and the contact between the contracted portions of the sections is effected by means of spacing ribs or fins which project sidewise from the walls of the water spaces of the sections and bear against each other, their faces being dressed or planed to make close contact. These contacting ribs or fins are arranged in such manner as to direct the flame and hot gases through the spaces between the narrow or contracted portions of these sections in the desired manner.

The front sections 22 and the front portions of the end sections are provided at their sides with rearwardly sloping or descending ribs or fins 36 and 37, which ribs need not all contact with each other, Figs. 3, 4, 8 and 9. As shown, only the ribs 36 make contact with each other. The spaces between these ribs form an upright series of air passages 38 at the front of the fuel receptacle through which the air for the support of combustion enters the column of fuel at the front.

Figure 3:
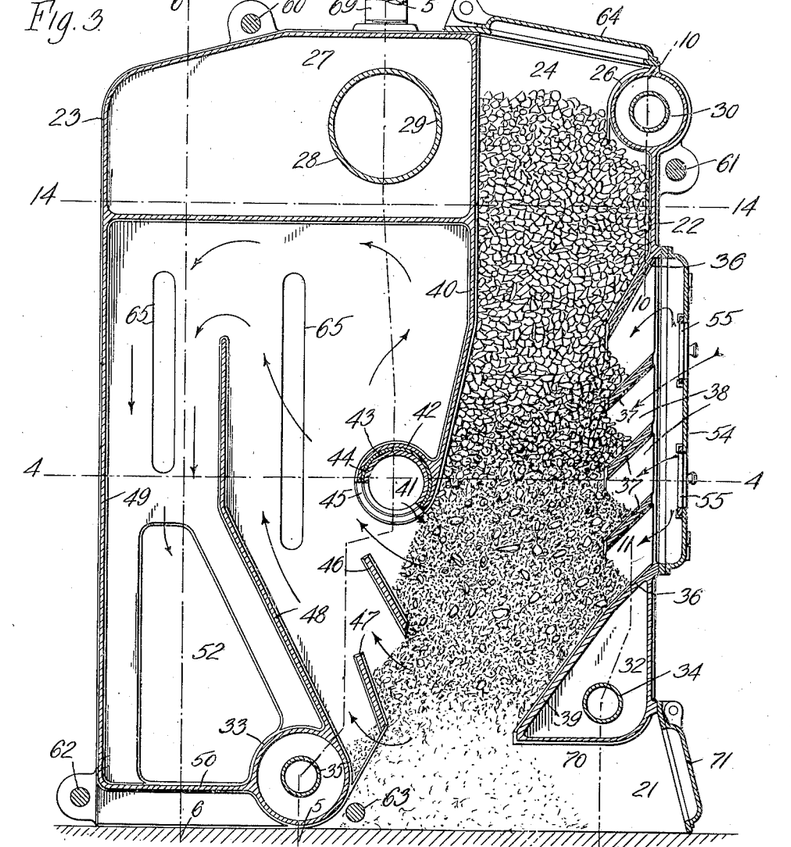
Fig. 3 is a vertical section, on an enlarged scale, through one of the flues or draft passages and the fuel receptacle on line 3—3, Fig. 4.
Figures 7, 8:
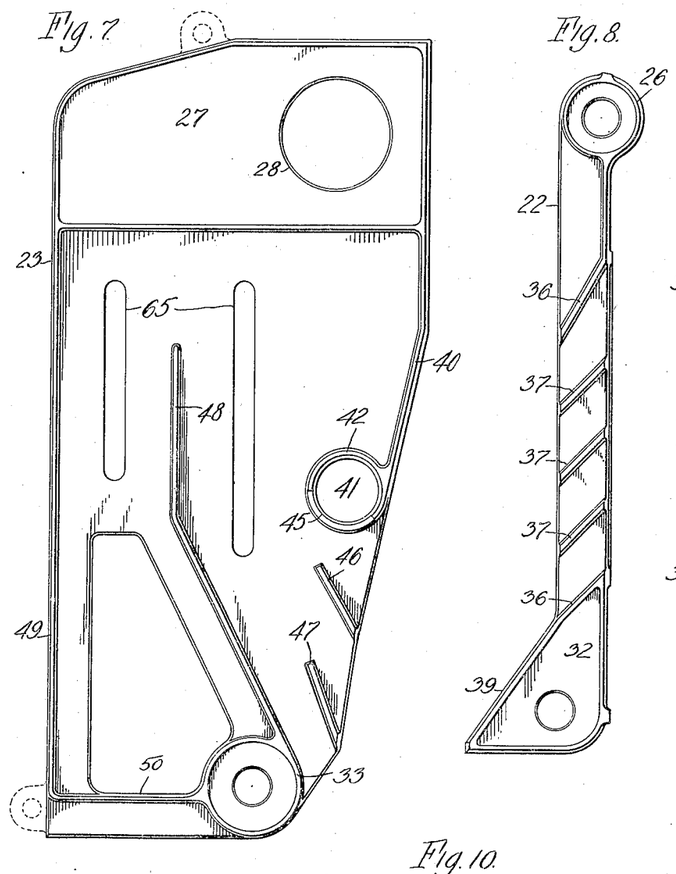
Fig. 7 is a side elevation of one of the intermediate rear sections.
Fig. 8 is a side elevation and Fig. 9 a front elevation of one of the intermediate front sections.
Figure 9:
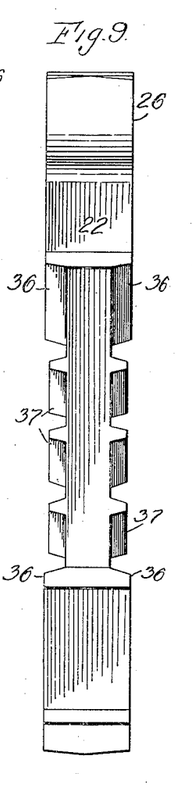
Figure 12:
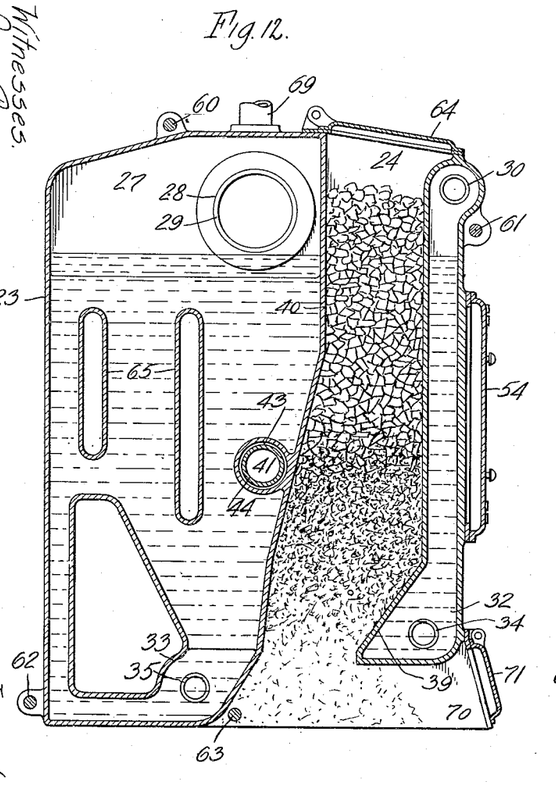
Fig. 12 is a vertical section through the water spaces of an intermediate front and an intermediate rear section on line 12—12, Fig. 4, but on the smaller scale of Figs. 1 and 2.
Figure 13:
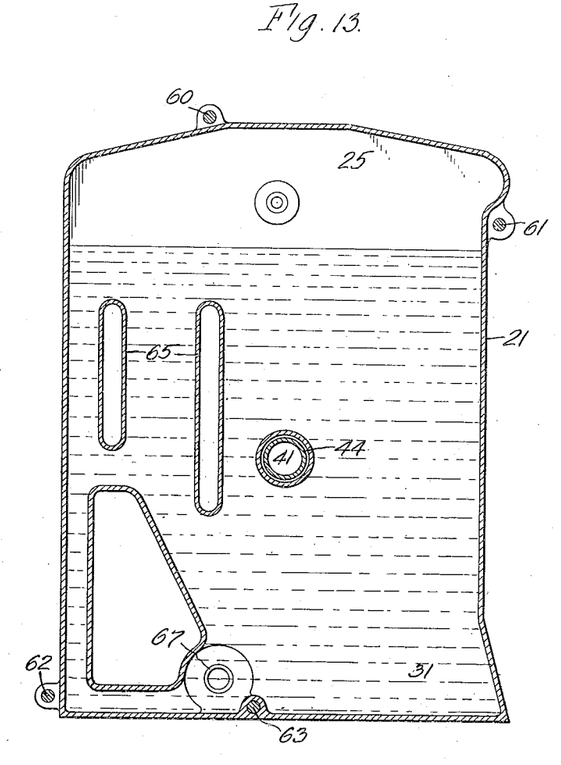
Fig. 13 is a similar section through the water space of one of the end sections on line 13—13, Fig. 4.

The rear wall 39 of the lower portion of each front section preferably slopes or descends rearwardly, Figs. 3, 8 and 12, and the front wall of each rear section also slopes or recedes rearwardly. Each rear section is provided at the front with contact ribs 40 which extend from the enlarged top portion of each section downwardly along both sides of the contracted portion thereof to a point which is approximately at the height or level of the most intense combustion in the fuel receptacle. A secondary or supplemental air inlet passage 41 extends transversely through the boiler at this point in rear of the fuel receptacle for the purpose of delivering an additional supply of heated air to the flame and combustible gases issuing from the receptacle.

Figure 2:
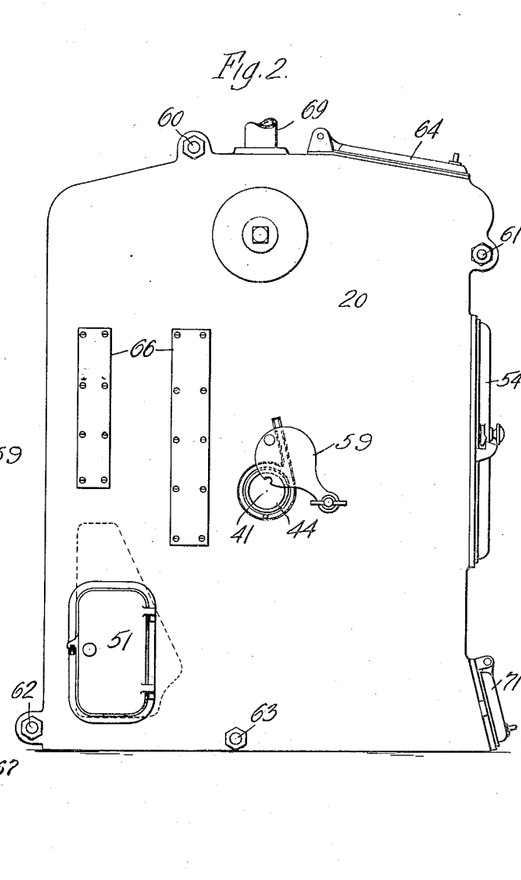
Fig. 2 is a side elevation viewed from the left hand side in Fig. 1.
Figure 14:
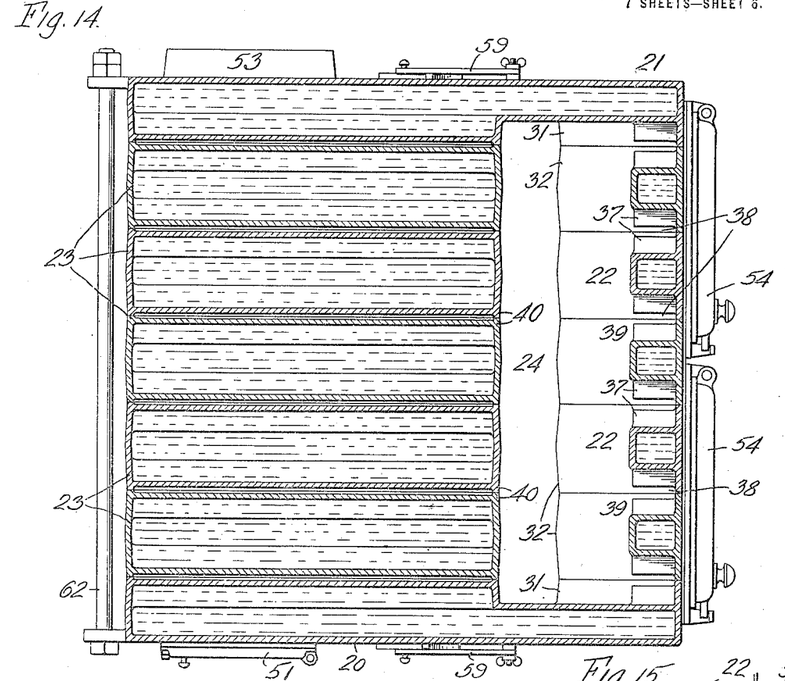
Fig. 14 is a horizontal section on line 14—14, Fig. 3.

This air inlet passage is preferably tubular and comprises as shown in Figs. 3, 4, 5, 7, 12, 13 and 16, contact collars 42 formed on the section, nipples 43 arranged within these collars and connecting the sections, and a tube 44 extending through all of the sections and nipples and open at one or both ends for the admission of air. The collars, nipples and tube are provided with segmental slots 45 or other suitable openings through which the air issues into the flues between the contracted portions of the rear sections. The admission of air to this tube may be regulated by any suitable means, for instance, by pivoted dampers 59, Figs. 2, 4 and 14.

The contracted portions of the rear sections are provided at their sides below the secondary air inlet with contacting fins or ribs 46, 47, 48, Figs. 3, 4 and 5, which extend upwardly and rearwardly from the front of the rear sections. These ribs confine the fuel and ashes in the lower portion of the fuel receptacle and direct the flame and hot gases upwardly and rearwardly, as indicated by the arrows. The upper portions of the rearmost ribs 48 are arranged vertically and form bridges or baffles over which the hot gases pass and behind which they descend to the lower portions of the flue spaces which are closed at the rear side and bottom by ribs 49 and 50. The end section 20 is provided in its lower portion behind this bridge with an opening for giving access to this space for cleaning the same, which opening is closed by a door 51, and the end section 21 is provided with a similar opening 52 surrounded by a collar 53 for connection with the smoke pipe.

The air for the support of combustion enters at the front of the fuel receptacle through the passages 38 between the front ribs 36, 37, and passes across the column of fuel in the receptacle. The flame and hot gases escape through the passages between the rear ribs 46, 47, 48, flow upwardly in front of the bridges, pass over the latter, descend on the rear side of the bridges and escape through the exit opening 52.

Figure 1:
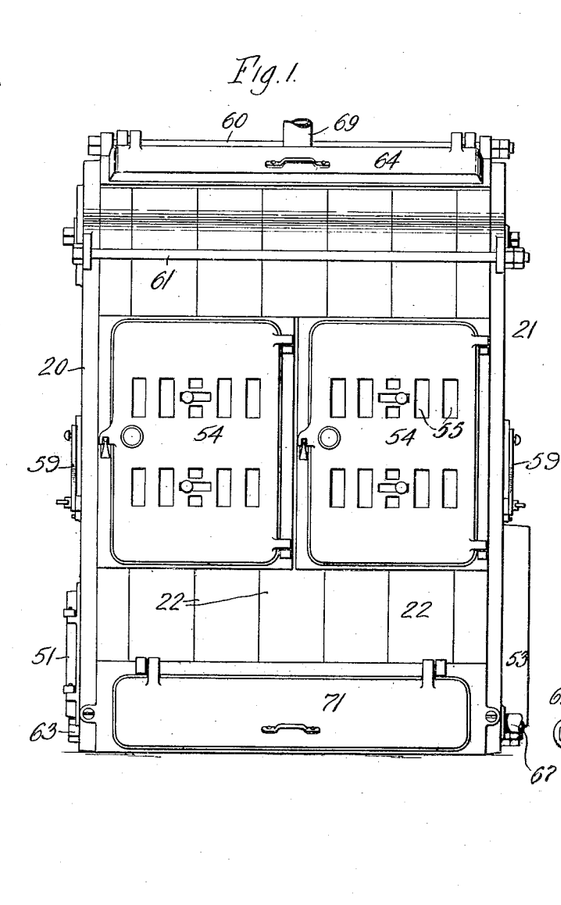
Figure 1 is a front elevation showing one form of boiler embodying my said invention.
Figure 4:
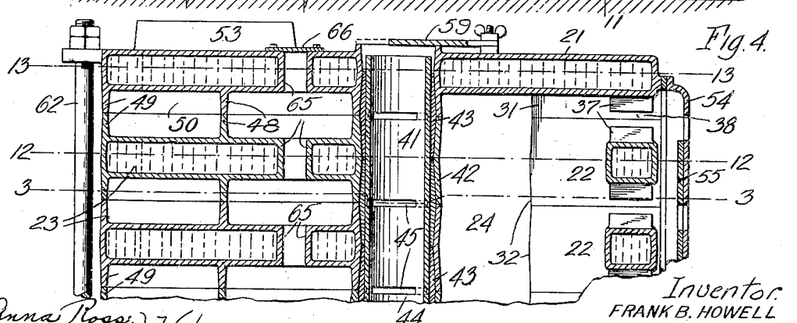
Fig. 4 is a fragmentary horizontal section on line 4—4, Fig. 3.
Figures 5, 6, 11:
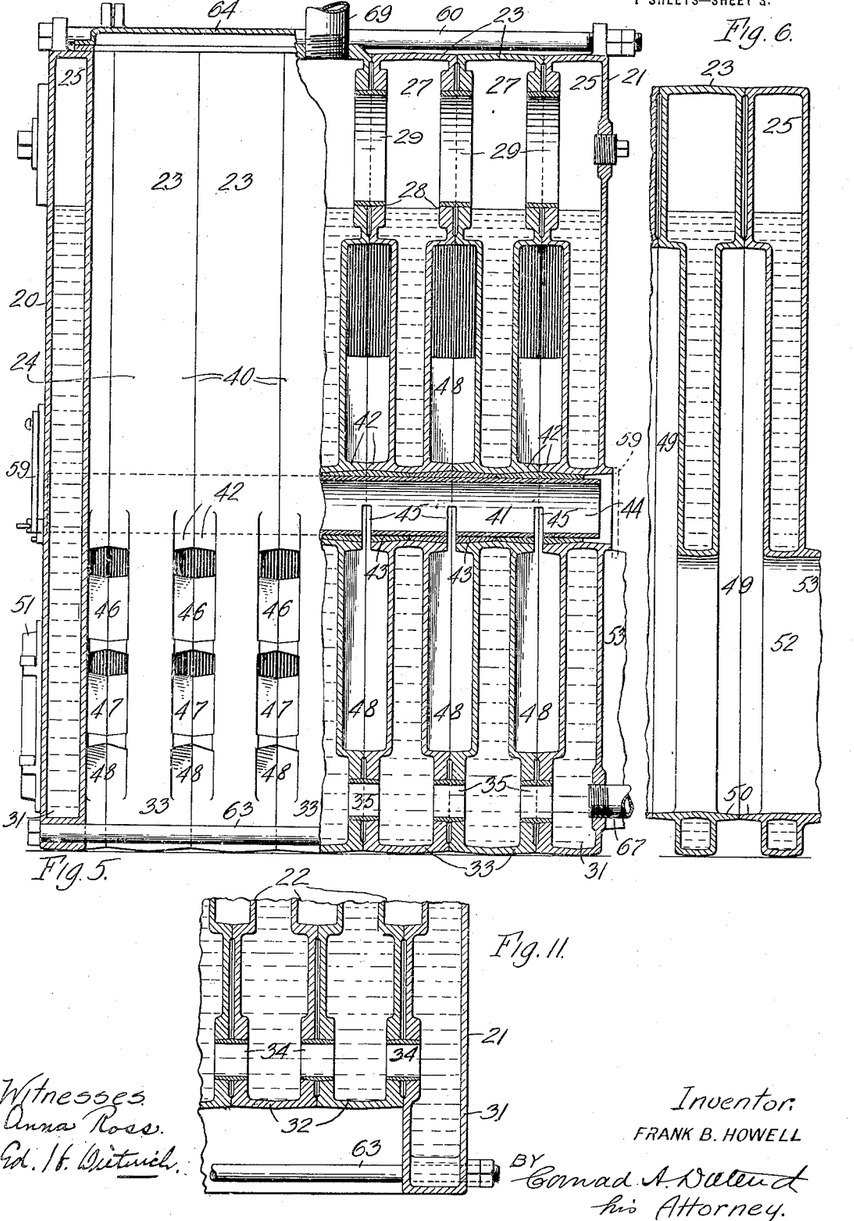
Fig. 5 is a vertical section transverse to the flues on line 5—5, Fig. 3.
Fig. 6 is a vertical section of the exit portion of the boiler on line 6—6, Fig. 3.
Fig. 11 is a similar view of the lower portions of several front sections on line 11—11, Fig. 3.

The front openings may be covered by doors 54 which are provided with air inlets controlled by dampers 55, Figs. 1, 3 and 4.

Figure 15:
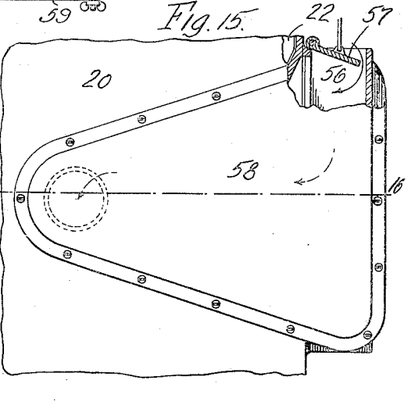
Fig. 15 is a fragmentary elevation, partly in section, of a modified construction of the air inlet chamber.
Figure 16:
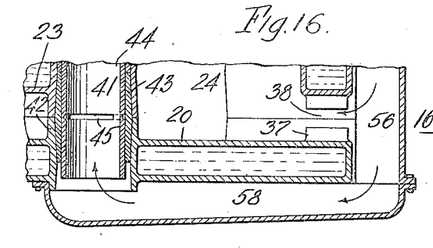
Fig. 16 is a horizontal section on line 16—16, Fig. 15.

In the construction represented in Figs. 15 and 16, the front air inlets of the fuel receptacle are covered by a chamber 56 which is open at the top, where a damper 57 is located. This chamber may be connected by a passage 58 with one end of the secondary air passage, the other end being closed, or a passage 58 may be connected with each end of the secondary air passage. Part of the air which enters the supply chamber 56 passes through the front openings into the fuel receptacle, while another part passes to the secondary passage. In this construction the damper 57 controls the air supply to the secondary passage as well as to the front or primary passages.

The sections are secured together by any suitable means, for instance, by bolts 60, 61, 62 and 63.

The fuel receptacle is provided with a cover 64.

The side walls of each rear section and of each end section are preferably connected by stay walls 65 which may have the form of upright loops, Figs. 3, 4, 7, 12 and 13. The spaces formed by these stay walls in the end sections are closed by covers 66, Figs. 2 and 4, which can be removed for cleaning the heating passages.

The water and steam pipes leading to and from the boiler may be arranged in any desired manner. In the drawings 67 represents the feed water pipe and 69 the steam pipe.

70 represents the ash pit and 71 the door thereof. The column of fuel may rest upon the ashes in the pit which in turn rest upon the floor, a grate being not necessary. The ashes are removed from the ash pit from time to time, as may be required for properly maintaining the fire.

Figure 17:
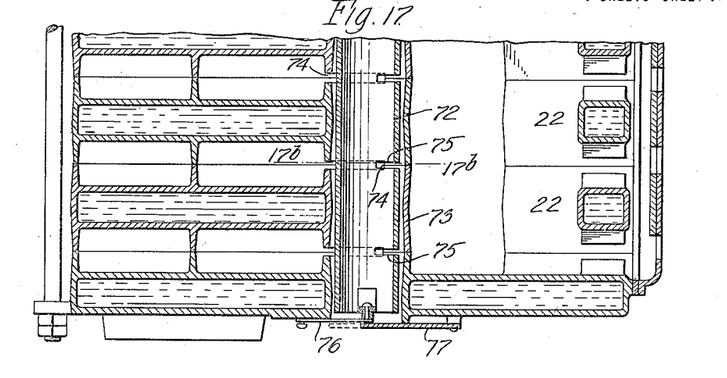
Fig. 17 is a horizontal section of one end of the boiler, showing a modified construction of the secondary air supply devices.
Figure 17A:
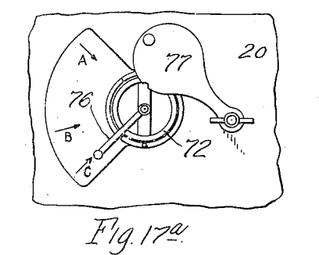
Fig. 17a is a fragmentary end elevation of the construction shown in Fig. 17.
Figure 17B:
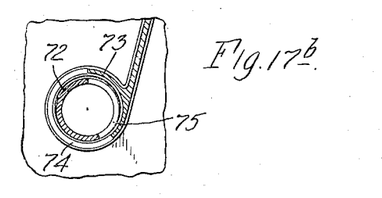
Fig. 17b is a fragmentary vertical section on line 17b, 17b, Fig. 17.

In the construction of the supplemental air inlet devices represented in Figs. 17, 17a and 17b, the connecting nipples are omitted and the tube 72 is rotatably arranged within the collars 73 of the sections. The faces of these collars are partly recessed to form segmental slots 74 which correspond with the segmental slots 75 of the tube. These slots are made of such length that they can be partially closed by turning the tube. Suitable means are provided for turning the tube, for instance, a hand lever 76 secured to one end of the tube, and the most desirable positions of the tube to supply the specific volume of air required for the particular fuel used are preferably indicated on the side of the boiler, as represented in Fig. 17a. A hinged cover 77 or other suitable closure is provided on the side of the boiler for closing the end of the tube, if desired.

Figure 18:
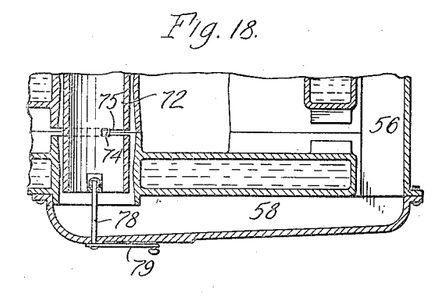
Fig. 18 is a fragmentary horizontal section, showing another modified construction of the secondary air supply devices.
Figure 18A:
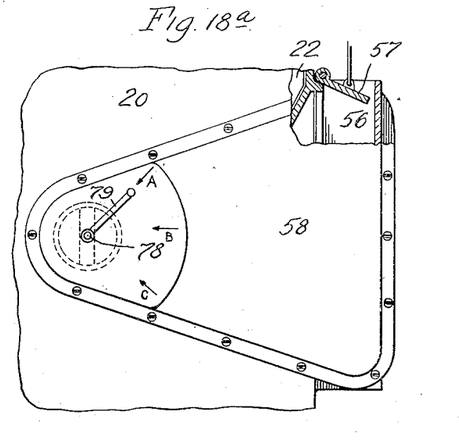
Fig. 18a is an end elevation of the same, partly in section.

In the modified construction represented in Figs. 18 and 18a, the stem 78 of the hand lever 79 extends through the air chamber 58 leading to the tube and the positions of the tube are indicated on this chamber.

In this improved boiler all kinds of fuel can be burned economically and smokelessly, particularly soft or bituminous coal, without requiring frequent attention and without necessitating the frequent cleaning of the flues and heating surfaces. The smokeless combustion of soft or bituminous coal and similar fuel is insured by the additional supply of air which is admitted in a highly heated state to the flame and hot gases at the point where they issue from the body of burning fuel in the fuel receptacle. This secondary air supply is highly heated in passing through the tubular air passage which lies in rear of the hottest part of the burning body of fuel, and by this means is caused to mingle with the combustible gases liberated by the fuel without cooling or reducing the temperature thereof.

The boiler sections can be made very narrow, thereby cutting up the water content in the boiler into a large number of comparatively thin layers, whereby the efficiency of the boiler is greatly increased.

Each section is provided with a plurality of solid or waterless fins or ribs which absorb heat and conduct the same to the walls against which the water lies and so assist in heating the water.

The sections can be readily planed or dressed off to form plane or true contact surfaces which render the employment of putty or cement for forming tight joints unnecessary. The sections being in contact by means of true mechanical joints form practically air tight flues, whereby the proper control of the combustion is greatly facilitated.

It is to be noted particularly that although I have shown the fuel receptacle as vertical in form, and a small quantity of coal disposed therein above the burning zone that the upper portion of said fuel receptacle is not intended to, and in view of the rate of combustion of fuel therein, does not serve as a magazine in the sense that such term is ordinarily used in boilers. The entire receptacle is only intended to receive and hold sufficient fuel to carry the same from one period of attention to the succeeding period and is not intended to receive a reserve supply of fuel which is to be shaken down at each period of attention.

In this application no claim has been made for the secondary air supply, as the same forms the subject-matter of a divisional application filed September 10th, 1921, Serial No. 499,664.

Having thus described my said invention what I claim and desire to secure by Letters Patent is:—

1. In a boiler, a grateless fuel receptacle having an unobstructed discharge outlet, and an ash pit positioned below said receptacle and communicating with said discharge outlet; said fuel receptacle comprising a burning portion of substantially uniform cross-sectional area, and a downwardly-tapering ash portion communicating with said burning portion and with said ash pit whereby to provide a constant volume of ash for supporting the fuel in said receptacle during the process of transmutation thereof into ash, and means for providing a draft transversely through the burning portion of said receptacle, substantially as specified.

2. In a boiler, a grateless fuel receptacle having an unobstructed discharge outlet, and an ash pit positioned below said receptacle and communicating with said discharge outlet; said fuel receptacle comprising a downwardly-flaring green fuel portion, a burning portion of substantially uniform cross-sectional area and a downwardly-tapering ash portion communicating with said burning portion and with said ash pit whereby to provide a constant volume of ash for supporting the fuel in said receptacle during the process of transmutation thereof into ash, and means for providing a draft transversely through the burning portion of said receptacle, substantially as specified.

3. In a boiler, a grateless fuel receptacle having an unobstructed discharge outlet, and an ash pit positioned below said receptacle and communicating with said discharge outlet; said fuel receptacle having walls entirely surrounding the fuel within said receptacle and extending throughout the height thereof, and comprising a burning portion of substantially uniform cross-sectional area, and a downwardly-tapering ash portion communicating with said burning portion and with said ash pit whereby to provide a constant volume of ash for supporting the fuel in said receptacle during the process of transmutation thereof into ash, and means for providing a draft transversely through the burning portion of said receptacle, substantially as specified.

4. In a boiler, a grateless fuel receptacle having an unobstructed discharge outlet, and an ash pit positioned below said receptacle and communicating with said discharge outlet; said fuel receptacle having walls entirely surrounding the fuel within said receptacle and extending continuously throughout the height thereof, and comprising a downwardly flaring green fuel portion, a burning portion of substantially uniform cross-sectional area, and a downwardly-tapering ash portion communicating with said burning portion and with said ash pit whereby to provide a constant volume of ash for supporting the fuel in said receptacle during the process of transmutation thereof into ash, and means for providing a draft transversely through the burning portion of said receptacle, substantially as specified.

Signed at the city of Buffalo, Erie county, in the State of New York, this 17th day of September, one thousand nine hundred and fourteen.

FRANK B. HOWELL.

Witnesses:
A. MERTZANOFF,
BENJAMIN RAY.